United States Patent
Mam

(10) Patent No.: US 10,061,653 B1
(45) Date of Patent: Aug. 28, 2018

(54) METHOD TO EXPOSE FILES ON TOP OF A VIRTUAL VOLUME

(71) Applicant: EMC Corporation, Hopkinton, MA (US)

(72) Inventor: Neelabh Mam, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 502 days.

(21) Appl. No.: 14/034,027

(22) Filed: Sep. 23, 2013

(51) Int. Cl.
*G06F 12/00* (2006.01)
*G06F 11/14* (2006.01)
*G06F 17/30* (2006.01)
*G06F 9/54* (2006.01)

(52) U.S. Cl.
CPC .... *G06F 11/1435* (2013.01); *G06F 17/30233* (2013.01); *G06F 9/542* (2013.01); *G06F 11/1456* (2013.01)

(58) Field of Classification Search
CPC ............... G06F 11/1451; G06F 9/542; G06F 17/30233; G06F 11/1466; G06F 17/30144; G06F 11/1453; G06F 11/1469; G06F 11/1456; G06F 2201/84; G06F 3/0482; G06F 11/2074; G06F 12/16
See application file for complete search history.

(56) References Cited

U.S. PATENT DOCUMENTS

| | | | |
|---|---|---|---|
| 7,631,155 B1 | 12/2009 | Bono et al. | |
| 7,694,191 B1 | 4/2010 | Bono et al. | |
| 7,818,535 B1 | 10/2010 | Bono et al. | |
| 7,870,356 B1 | 1/2011 | Veeraswamy et al. | |
| 8,117,244 B2* | 2/2012 | Marinov | G06F 17/30079 707/827 |
| 8,285,758 B1 | 10/2012 | Bono et al. | |
| 8,566,371 B1 | 10/2013 | Bono et al. | |
| 9,383,924 B1* | 7/2016 | Fullbright | G06F 3/0608 |
| 2004/0107318 A1* | 6/2004 | Bono | G06F 12/0866 711/118 |
| 2005/0044162 A1 | 2/2005 | Liang et al. | |
| 2007/0136548 A1 | 6/2007 | Mane | |
| 2010/0088349 A1* | 4/2010 | Parab | G06F 17/30156 707/802 |
| 2010/0257218 A1* | 10/2010 | Vassilev | G06F 17/30233 707/823 |
| 2010/0287140 A1* | 11/2010 | Oza | G06F 9/542 707/640 |

(Continued)

OTHER PUBLICATIONS

"Why does my single-byte write take forever?" The Old New Thing, MSDN Blogs, Sep. 22, 2011.*

(Continued)

*Primary Examiner* — Matthew Bradley
*Assistant Examiner* — Francisco A Grullon
(74) *Attorney, Agent, or Firm* — Polsinelli PC

(57) ABSTRACT

Approaches to expose a remotely located file on top of a virtual volume, at the volume level. The need to backup individual files as opposed to backing up the entire container volume in sparse mode had become apparent. Creating a novel method of exposing individual backed up files at the volume level avoids the associated reboot issues, performance issues and the need to operate at the file system level. The backup storage device can be any arbitrary device, such as a dedupe storage, NAS device, CIFS share, FTP server, or any other type of storage device.

17 Claims, 9 Drawing Sheets

(56) References Cited

U.S. PATENT DOCUMENTS

2011/0218968 A1* 9/2011 Liu ...................... G06F 3/0482
707/649
2012/0167080 A1* 6/2012 Vilayannur ........... G06F 3/0608
718/1

OTHER PUBLICATIONS

Opportunistic Locks, Aug. 13, 2013, 3 pages, Microsoft Corporation, Redmond, WA.
FsRtlOplockFsctrl function (Windows Drivers), Feb. 4, 2013, 6 pages, Microsoft Corporation, Redmond, WA.
FltCheckOplock callback function, May 15, 2013, 6 pages, Microsoft Corporation, Redmond, WA.
FSCTL_OPLOCK_BREAK_NOTIFY control code (Windows Drivers), Feb. 7, 2013, 2 pages, Microsoft Corporation, Redmond, WA.
SetFile ValidData Function, Nov. 5, 2012, 6 pages, Microsoft Corporation, Redmond, WA.
FSCTL_SET_SPARSE control code (Windows), Feb. 24, 2013, 4 pages, Microsoft Corporation, Redmond, WA.

* cited by examiner

METHOD TO EXPOSE FILES ON TOP OF A VIRTUAL VOLUME

FIELD OF THE INVENTION

The various embodiments described herein relate generally to a method to expose files on top of a virtual volume, and in particular exposing an individually backed up file while operating at the volume level.

BACKGROUND

In today's computing environments, it is often desirable to backup computer data by copying and archiving the data (e.g., creating a backup image) so that the data may be restored after a data loss event (e.g., hardware failure, etc.). Generally, there are at least two types of backup applications that are implemented in this regard. File-level backup applications copy data from a source location to a backup location on a file-by-file basis regardless of where the data of the file is physically stored. This means that the backup application attempts to build and replicate the original file by reading the logical file system present on the original location. The granularity of the resulting backup entities for file-level backups is therefore individual files. Block-level backup applications, on the other hand, bypass the file system and perform backups of entire volumes of data from the original location. One advantage of bypassing the file system in such a manner is that there is no penalty in performance in cases where the original location contains large numbers of files (such performance impacts may take place if file-level backup were to be used). As a result of bypassing the file system, the granularity of the resulting backup entity for block-level backups is therefore the entire volume's image (i.e., binary image).

When restoring data from backup, it is often desirable to enable users to view and select which individual files they would like to restore rather than requiring a full restore of the entire volume, which can be substantial in size. In order to perform such file-level recovery (FLR), the operating system has mounted the backup image, thereby exposing the file system of image.

BRIEF DESCRIPTION OF THE DRAWINGS

Various embodiments in accordance with the present disclosure will be described with reference to the drawings, in which.

DETAILED DESCRIPTION

Figure 1:
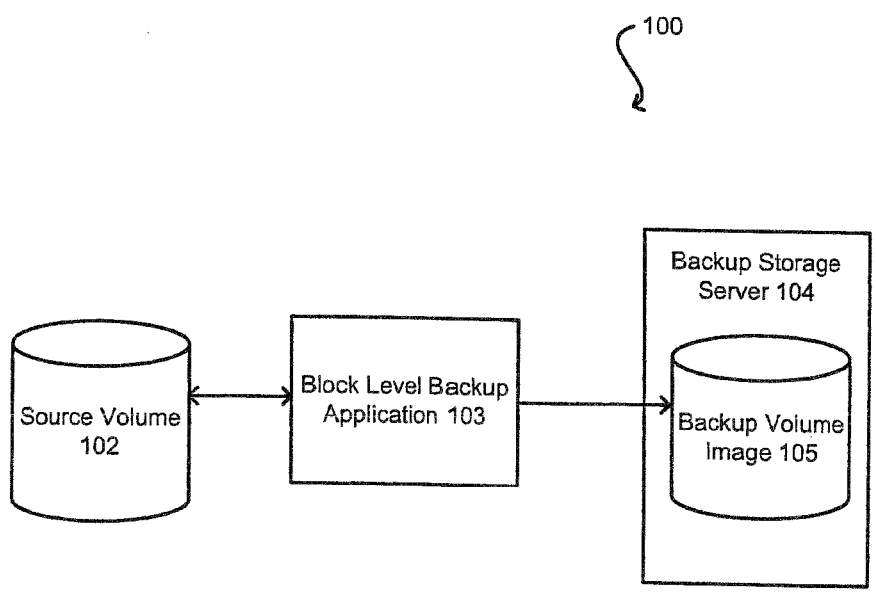
FIG. 1 illustrates an example of a block level backup application copying data from a source volume to create a block level backup image, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments described in this disclosure enable a block level backup image to be mounted by the operating system even in cases where the operating system does not have native support for the interfaces (e.g., APIs) to access the backup image. The mounting of the backup image exposes the file system on the backup image and allows the user to perform granular file level recovery (FLR) when restoring data from the backup image. The mounting of the image and enabling data to be read from the image is performed by loading a kernel mode driver and a user mode data feeder application onto the computing device. These two components (i.e., the kernel mode driver and the user mode application) interact with one another to enable input/output (I/O) operations to be performed on the backup image.

In various embodiments, after a kernel mode driver is loaded on an operating system of a computing device, the kernel mode driver creates a device object in the operating system to represent a disk type of device. This device object will serve as the target of all I/O operations for the backup image. Once the device object has been created, a name can be associated with it, and the user mode can access it to cause the operating system to mount the device. After the device object has been mounted, the kernel mode driver can begin to service read operations targeted on the device object.

In accordance with an embodiment, a read operation may be received from the I/O manager and serviced by the kernel mode driver. Generally, the read operation specifies a starting read offset and a length of the read. Once the kernel mode driver receives the read operation, the kernel mode driver can write the starting read offset and the length to a memory section that is shared between the kernel mode driver and the user mode application. After the starting offset and the length of the read operation has been written to the shared memory section, the kernel mode driver can issue an event to the user mode application, indicating that the read operation has been received.

In response to the event, the user mode application reads data from the backup image and copies the data to the shared memory section. In order to read the data from the backup image, the user mode application may need to convert the starting read offset of the read operation into the starting read offset of the backup image. For example, it may be that the read operation specifies a volume level offset and the user mode application may need to convert the volume level offset into a disk level offset to be used on the backup image. Once the user mode application has converted the offset, it can use the converted offset to read the correct data from the backup image and copy it to the shared memory section, where the kernel mode can access the data. After the user mode application has copied the data to the shared memory section, it issues an event to the kernel mode driver, indicating that it has completed the read operation and that the data is in the shared memory section. In response to receiving the event, the kernel mode driver copies the data from the shared memory section to a system buffer that has been designated by the I/O manager and completes the read operation.

FIG. 1 illustrates an example 100 of a block level backup application copying data from a source volume to create a block level backup image, in accordance with various embodiments. As previously described, the block level backup application 103 can bypass the file system of the source volume 102 and perform backups of the entire source volume 102. One advantage of bypassing the file system in such a manner is that if the source volume contains a large number (e.g., thousands) of files, there is no penalty in performance which would otherwise be incurred if performing file-level backup. Once the block level backup application 103 finishes copying the data from the source volume to the backup storage server 104, the resulting entity on the backup server is the entire backup volume image 105. The backup volume image 105 implicitly preserves the file system layout of the original source volume 102, thereby eliminating the need to generate and manage file indexes for granular recovery.

Conventionally, the volume image format that the block based backup application 103 may use varies depending on several factors, such as the target operating system (OS) for which backups are being generated, the maximum supported size for block level backups and the ability of the underlying operating system to mount it. A volume image can be flat or a sparse volume image or even a disk image containing volume data inside (again in both, fixed as well as sparse mode). As discussed above, the eventual choice of the actual backup image 105 format that is used generally depends on the ability of the operating system to mount it. Mounting the backup volume image 105 exposes the logical file system inside the backup volume image 105 to the end user, allowing the end user to perform granular recovery when the actual backup was performed at volume level, i.e., by bypassing the file system. So for example, a virtual hard disk (VHD) file in the Microsoft Windows™ operating system is a virtual disk container which is used for hosting file systems. Windows operating system has a native VHD image mount driver by the name "vhdmp.sys". This is a component of the operating system and is responsible for mounting logical volumes that resides inside an overlaying disk image (VHD files). Conventionally, the native VHD image mount, as supported by vhdmp.sys, may be limited to the scenario where the target VHD file is accessible via operating system's direct file access capability or via the redirector subsystem inside the kernel. This implies that it can only mount VHD files which reside either on an NTFS volume or a CIFS share, both of which should be exposed locally on the system. It would not be able to support mounting of a VHD file backed up to a storage server for which the OS has no API support. If, the operating system's vhdmp.sys mount driver does not have support for the interfaces exposed by the storage server to pull data out, the native VHD mount is not able to mount such a VHD file or read data from it.

Conventionally, the native OS mount may also be restrictive when it comes to the ability to mount a VHD chain. In this scenario, all individual parent VHDs whose relative paths are embedded inside child VHDs must be accessible using the same hard coded absolute or relative paths. This makes it restrictive for the backup application in terms of the ability to move incremental backups in a chain to alternate servers in case the primary server runs out of storage space or for other reasons. Furthermore, it supports only VHD files as the overlaying disk image format as the container for the volume level data. It would not conventionally support mounting a virtual machine disk (VMDK) or a virtual desktop infrastructure (VDI) disk image.

In light of such conventional restrictions, the various embodiments described herein enable an approach to mount block level backup images (e.g., VHD, VHDx, VMDK, VDI etc.) on a conventional operating system, such as MS Windows. These images, of arbitrary format, can be physically residing on any arbitrary location as long as the server hosting them exposes a read/seek interface on the image file. Furthermore, individual incremental backups in a chained series can be on physically disjoint media. Specifically with respect to VHD and VMDKs, this effectively breaks the restriction of preserving relative path layout of individual parent VHDs required with the native OS mount, thereby enabling the backup application to continue with incremental backups in case the currently active backup server runs out of storage space for holding subsequent incremental backups.

In various embodiments, one implementation of such an approach may include a kernel mode driver and a user mode application. These two components may work together to enable the block level backup image to be mounted in the OS and to enable read/write operations to be performed on the block level backup image.

Figure 2:
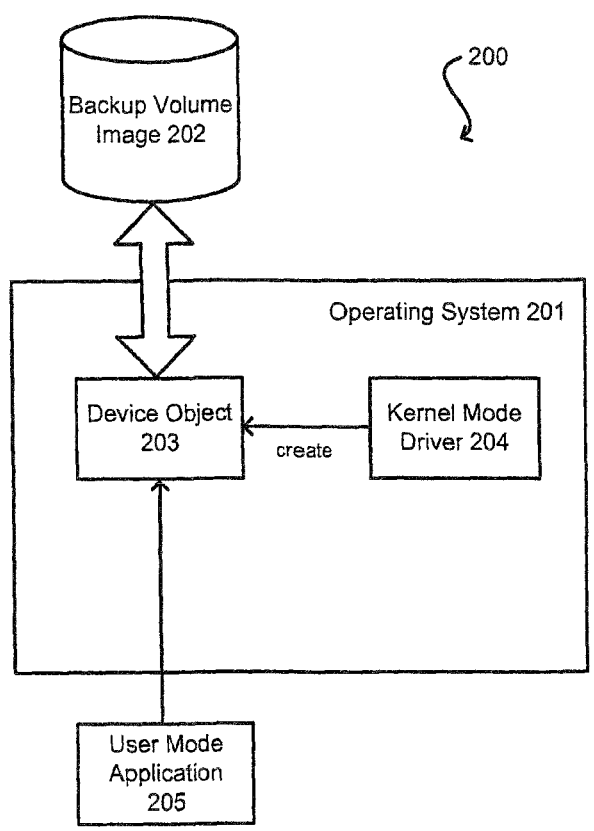
FIG. 2 illustrates an example of a kernel mode driver creating a device object that will serve as a target of I/O operations on the backup volume image, in accordance with various embodiments.

FIG. 2 illustrates an example 200 of a kernel mode driver creating a device object that will serve as a target of I/O operations on the backup volume image 202, in accordance with various embodiments. As shown in the illustration, the kernel mode driver 204 (e.g., in its driver entry routine at time T1) creates a named device object 203 of type FILE_DEVICE_DISK. The operating system 201 (e.g., Windows) represents physical devices by device objects. One or more device objects are associated with each physical device. Device objects serve as target of all operations on the device. As such, the device object 203 which the kernel mode driver 204 creates represents a logical volume device and becomes the seed which would trigger subsequent mount process. At this point the volume device is not yet mounted. This is because the OS 201 would mount the volume only when the corresponding logical volume device object 203 is accessed and this can happen from either user mode or from inside the kernel.

After the device object 203 has been created, (i.e., at an arbitrary forward time T2) the user mode application 205 associates an arbitrary volume name (e.g., "KM719") with the device object 203 created by the kernel mode driver 204. This name can be a simple string or a drive identifier (e.g., "T:"). Once this is performed, the device object 204 can be accessed from the user mode application 205 using the operating system's naming convention as highlighted (e.g., "\\?\KM719\\") and the container file system's root directory as \\?\KM719\\. Alternatively, in embodiments where a drive identifier has been associated with the device object, the device object 203 can be accessed like any other volume that has a drive letter associated with it.

After user mode application 205 process associates a name with the device object 203, it "accesses" the device object 203 for the first time (e.g., using the name associated with it such as "\\?\KM719") by sending a custom I/O control code, (e.g., Windows I/O control code "IOCTL_BB_MOUNT"). The handler of this I/O control code creates a number of event objects and a section object and then maps a view of the section object into the address space of the current process (i.e., the process that is sending the I/O control code). A section object represents a section of memory that can be shared. Memory view of the section object is used to hold incoming data from user mode application 205, while event objects are used for synchronizing data feed (by the user mode application 205) and consumption (by the kernel mode driver 204). Inside the kernel, on the very first access to a device of disk type (e.g., FILE_DEVICE_DISK), the operating system attempts a file system mount on it. The volume mount process involves invoking methods in the File System Recognizer (FSR) component of the operating system 201, which is responsible for detecting the type of file system contained inside the media that is in the process of being mounted.

In various embodiments, the process of invoking the FSR component is performed by examining volume signatures on the disk. The signature is a set of unique values located at a particular byte offset from the beginning of the volume. When the I/O Manager of the OS 201 finds a device object 203 for a physical media device (e.g., a device with the type FILE_DEVICE_DISK) that device object 203 will have a volume parameter block (VPB) which will indicate if the volume has been mounted. If it has been mounted, the VPB will point to the device object 203 belonging to the file system. If it has not been mounted, the I/O Manager will attempt to mount it by invoking the FSR. The process of mounting may include the I/O Manager calling each registered file system to claim support for the volume (i.e., backup volume image 202) inside the media. For example, in Windows OS, this can be done by calling the file system's FS control dispatch entry point with the minor function code "IRP_MN_MOUNT_VOLUME". The I/O Manager then asks each file system in turn if the volume can be mounted by that particular file system. If a particular file system driver, (e.g., NTFS) detects and claims the volume, then it starts sending read I/Os (e.g., "IRP_MJ_READ") on the device object 203 which was created by the kernel mode driver 204. File systems are typically called in last registered first called order. The minor function code (e.g., IRP_MN_MOUNT_VOLUME) handler for each file system attempts to read their file system recognition structures from the on-media data by initiating read operations (e.g., IRP_MJ_READ) to the device object 203 created by the kernel mode driver 204. If all checks are successful, the file system driver claims ownership of the volume and the File System Recognition phase is over. At this point, a file system is logically layered on top of the volume device object 203.

Figure 3A:
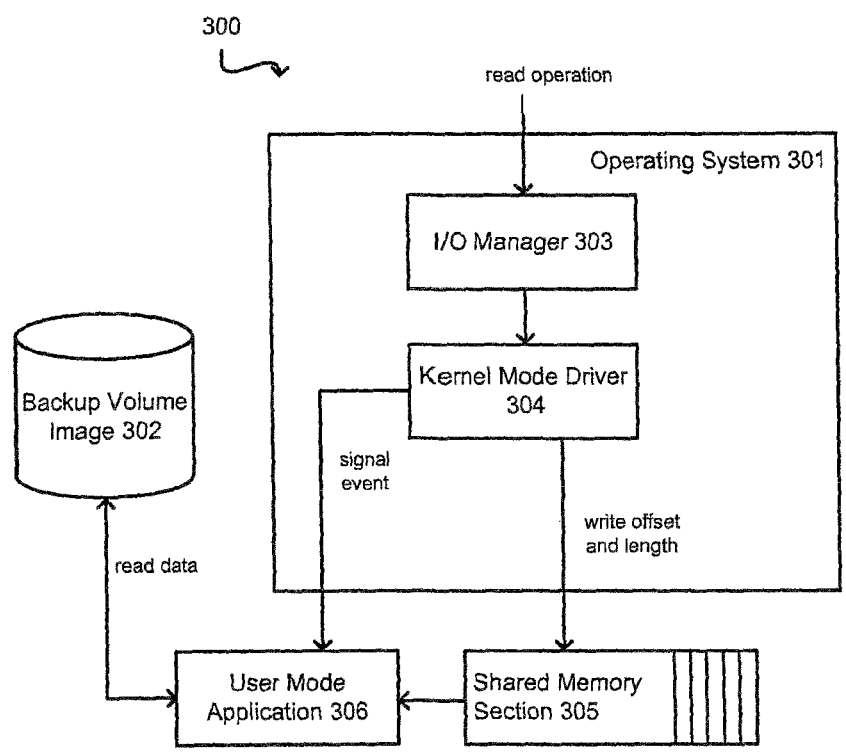
FIG. 3A illustrates an example of receiving a read operation and processing the read operation using a kernel mode driver and a user mode application, in accordance with various embodiments.

FIG. 3A illustrates an example 300 of receiving a read operation and processing the read operation using a kernel mode driver and a user mode application, in accordance with various embodiments. In operating system 301, read operations (e.g., IRP_MJ_READs) targeted on the device object to read volume level data from the backup volume image 302 are serviced in the kernel mode driver's 304 read dispatch handler (e.g., IRP_MJ_READ dispatch handler). As shown in the illustration, upon receiving the read operation from the I/O manager 303, the kernel mode driver 304 creates a shared memory section 305 and opens the same shared memory section 305 from inside the user mode application 306. Two (or more) named kernel event dispatcher objects are then used to synchronize reads and writes to the shared memory section 305.

Subsequently, in response to receiving a read operation (e.g., IRP_MJ_READ), the kernel mode driver 304 first copies the read offset and the length of the read operation into the shared section 305. Notably, at this point, the read offset and the length are volume level offsets. After the read offset and length have been copied to the shared memory section, the kernel mode signals event 1 to the user mode application 305 (indicating to the user mode application 305 that the read operation has been received) and begins to wait for event 2 (i.e., the event that will be signaled by the user mode application 305 once it completes the read).

A dedicated read thread in the user mode application 306 waiting for event 1 would then yield from its wait state because of event 1 and proceed to execute the read operation on the backup volume image 302 by taking the offset and length currently written in the shared memory section 305. Notably, in some embodiments, the user mode application 306 may need to convert the read offset stored in the shared memory section from volume level offset into a disk level offset. The process for converting the read offset will be described in further detail later in this disclosure.

Figure 3B:
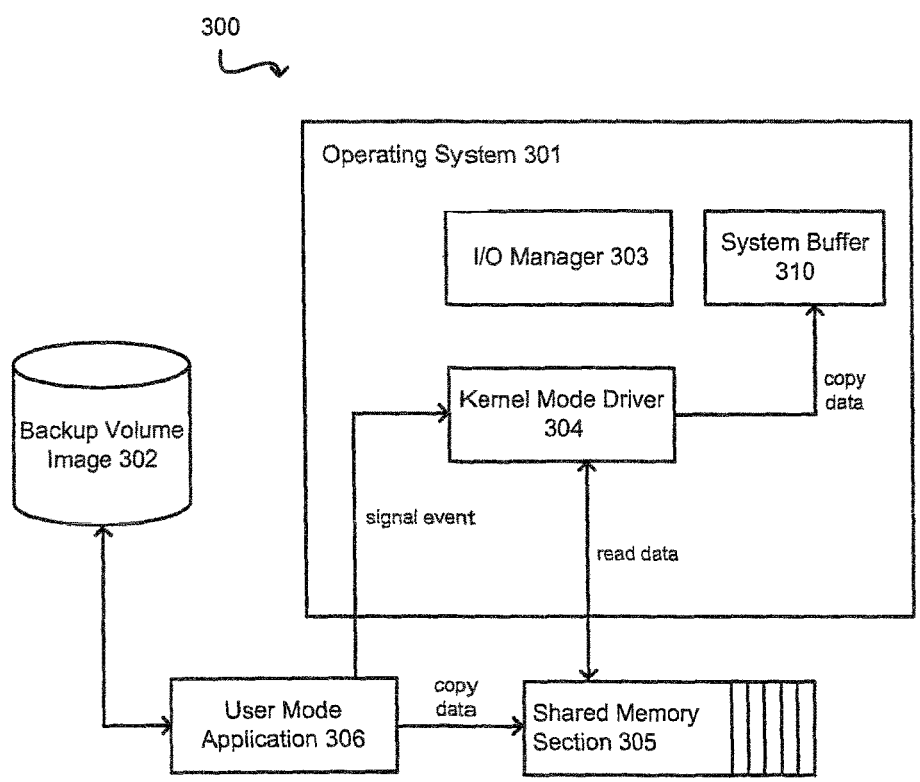
FIG. 3B illustrates an example of the user mode application completing the read operation shown in FIG. 3A, in accordance with various embodiments.

FIG. 3B illustrates an example 320 of the user mode application completing the read operation shown in FIG. 3A, in accordance with various embodiments. As previously described, the user mode application 306 performs the read on the backup volume image 302 using the offset obtained from the shared memory section 305. In one embodiment, the output buffer of the read operation is the beginning of the shared memory section 305. This means that the resulting data read from the backup volume image 302 would be written to the shared memory section 305. The read operation itself can be any type of read on a file abstraction that supports seeking. For example, the read operation may be, but is not limited to, a file transfer protocol (FTP) read operation, a secure file transfer protocol (SFTP) read operation, a hypertext transfer protocol (HTTP) read operation, or a data domain boost (DD Boost) read operation, among others. The user mode application 306 would physically present length bytes of data from the requested offset into the shared memory section 305 and then signal event 2, which would signify the end of the read operation from the perspective of the user mode application 306.

Once the read is performed by the user mode application 306 and the event 2 has been signaled, the kernel mode driver 304 (e.g., IRP_MJ_READ dispatch routine) waiting on event 2 would yield and would copy the data present in the shared memory section 305 directly into the system buffer 310 (e.g., irp->MdlAddress member of the read IRP) and eventually complete the read request (e.g., by calling IoCompleteRequest).

As previously mentioned, in some cases the user mode application may need to convert the volume level read offset into a disk level read offset in order to perform the read on the backup volume image. Conventionally, a volume image can be a flat or a sparse volume image or even a disk image containing volume data inside (in both fixed, as well as sparse mode). The read offsets received inside kernel, against the logical volume device created by the kernel mode driver are volume level offsets. Therefore, the user mode application needs some kind of mechanism which converts these volume level offsets to "inside the image file" offsets so that it can read data at the latter offset from the image file and eventually feed it to the kernel. For flat volume images, converting volume level offsets to image file offset is straightforward as the backed up image file is in itself, the volume's image, meaning that a volume offset x received inside kernel would map directly to image file offset x and so on. On the other hand, if the volume is hosted inside an overlaying disk image, then the task would include converting volume level offsets into disk level offsets. To accomplish this, the user mode application would need to find the volume's "inside the overlaying disk start offset" and then add this offset to the volume level offset for which data is requested by the driver. The reads on the backup volume image would then have to be done on this new offset.

Various embodiments described herein modify the way read operations (e.g., IRP_MJ_READs in Windows) are serviced by an image mount driver. Instead of servicing read request in kernel mode, while the dispatch handler (e.g., IRP_MJ_READ dispatch handler) is executing (restrictive in terms of the available file access API), the various embodiments utilize a mechanism which moves this task to the user mode which can have much more expansive support for such file based APIs. For example certain storage servers' read API calls are file based APIs which operate only in user mode. For these servers, kernel mode port may not be available. However, for those servers, the respective read function usually exposes a combined read/seek interface which is functionally equivalent to regular C runtime read/seek interfaces. As such, the various embodiments described herein can allow such servers to be utilized for storing block level backup images in a simpler and more efficient manner.

Similarly there are a lot of user mode file transfer protocol (FTP) libraries that allow programmatic access to data stored on FTP servers. The user mode read thread which services the read I/O request packets (e.g., IRP_MJ_READ IRPs) can make use of these user mode FTP libraries to satisfy mount driver's read request on disk image data. Same holds true for Web servers. Basically, image file mounts would be possible using the techniques illustrated herein if the server that hosts the image is capable of presenting a file read/seek abstraction, as previously described. Furthermore, the use of a shared memory section can ensure that there is minimal performance impact as the output buffers used in the user mode reads are directly the memory section shared by the kernel mode driver. As such, the performance in this method would be similar to the performance of the underlying file access API used to service the read request from the user mode. This method also allows mounting of volume images on Windows operating systems that do not support that particular image file format. For example, Windows XP or 2003 server cannot mount VHD or VHDx files since the native VHD(x) mount driver (vhdmp.sys) was introduced starting Windows Vista and beyond. The embodiments described herein are capable of exposing the backed up volume image on such an operating system as well.

Figure 4:
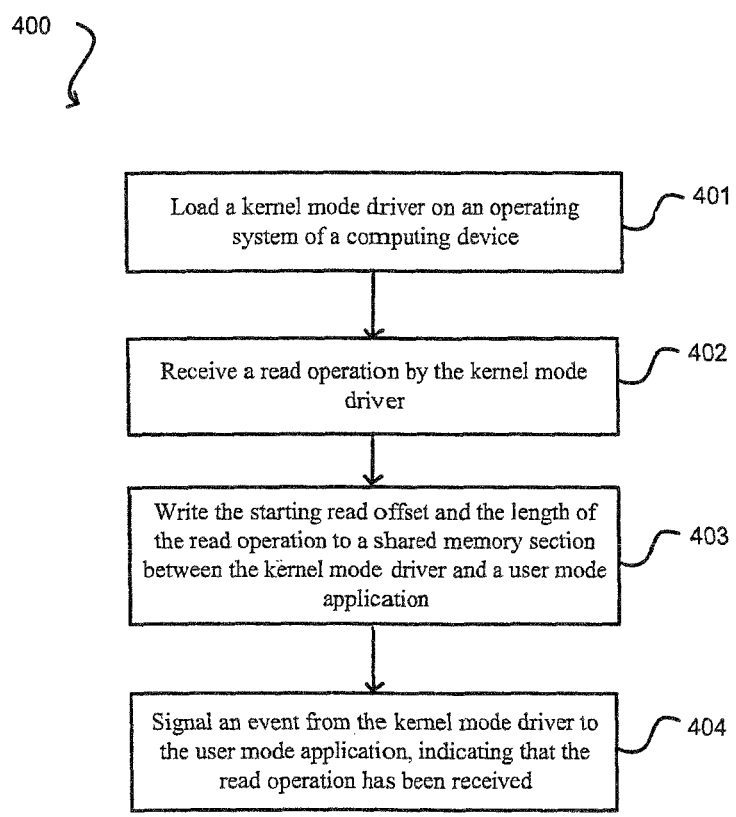
FIG. 4 illustrates an example of a process for processing a read operation by the kernel mode driver, in accordance with various embodiments.

FIG. 4 illustrates an example 400 of a process for processing a read operation by the kernel mode driver, in accordance with various embodiments. Although this figure as well as other process flows contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 401, a kernel mode driver is loaded on an operating system of a computing device. For example, the operating system may be a Microsoft Windows based operating system. Once loaded, the kernel mode driver creates a device object to represent the block level backup image. The backup image can be associated with a name (or other identifier) and mounted by the operating system. In operation 402, the kernel mode driver receives a read operation, e.g., as may be received from an I/O manager of the operating system. The read operation may have an associated offset and length. In various embodiments, the offset of the read operation is a volume level offset.

Once the kernel mode driver receives the read operation, it writes the offset and length of the read operation into a shared memory section, as shown in operation 403. The shared memory section is accessible by the kernel mode driver and a user mode application. In at least some embodiments, the shared memory section is allocated by creating a section object in the Windows OS. A process can use a section object to share parts of its memory address space (memory sections) with other processes. The section object can be created by a process in the kernel mode driver to share the memory section with the user mode application.

In operation 404, once the kernel mode driver has written the offset and length of the read operation into the shared memory section, the kernel mode driver signals an event to the user mode application. The event indicates to the user mode application that the read operation has been received by the kernel mode and the offset and length of the read operation have been written to the shared memory section. In at least some embodiments, the event can be implemented as a Windows event object which is a synchronization object whose state can be explicitly set to signaled by use of a SetEvent function.

Figure 5:
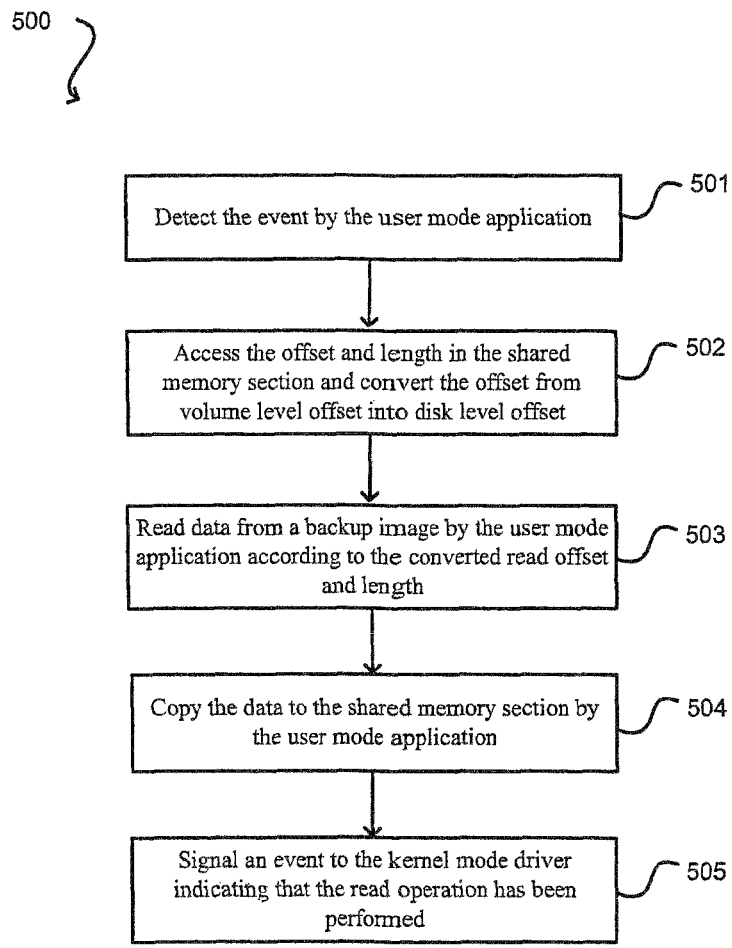
FIG. 5 illustrates an example of a process for processing the read operation by the user mode application, in accordance with various embodiments.

FIG. 5 illustrates an example 500 of a process for processing the read operation by the user mode application, in accordance with various embodiments. As shown in operation 501, the user mode application detects the event signaled by the kernel mode driver. For example, a dedicated read thread in the user mode application waiting for the event from the kernel mode driver may yield from its wait state as a result of the event. In operation 502, the user mode accesses the offset and length in the memory section and converts the offset from volume level offset to disk level offset, as previously described. In operation 503, the user mode application then reads the data from the backup image. In one embodiment, the data is read using the converted offset and the length obtained from the shared memory section.

Once the read is performed, the user mode application copies the data to the shared memory section, as shown in operation 504. Once the data is written, the user mode application signals an event to the kernel mode driver. This event indicates to the kernel mode driver that the read has been executed and that the data is now in the shared memory section. In response to the event, the kernel mode driver can proceed to write the data to a system buffer to complete the read request.

Figure 6:
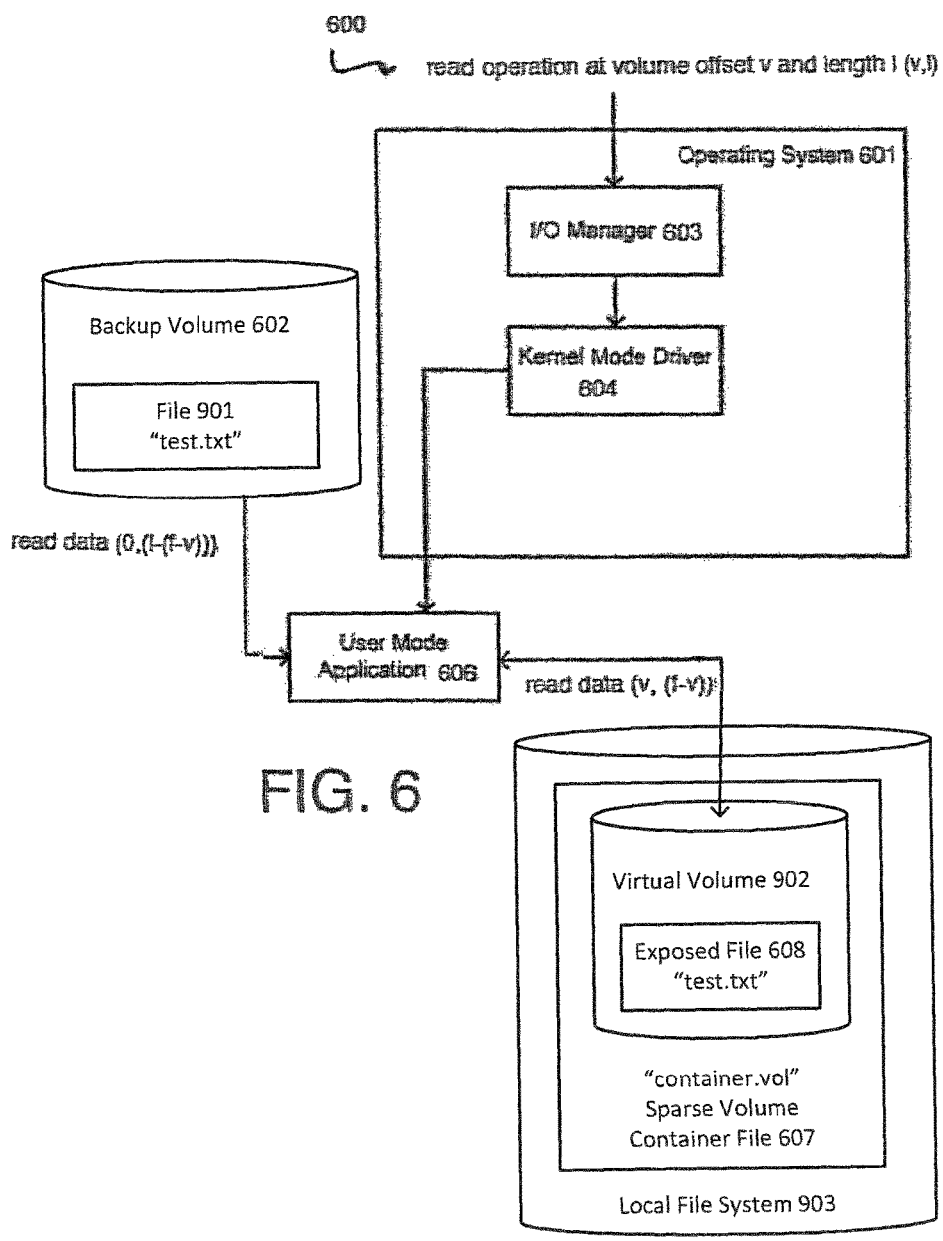
FIG. 6 illustrates an example of receiving a read operation and processing the read operation from the exposed file and from the backup volume, in accordance with various embodiments.

FIG. 6 illustrates an example 600 of exposing a remotely located file 901 by providing an exposed local version 608 on top of a virtual volume 902, in accordance with various embodiments. Exposing the remotely located file 901 on top of the virtual volume 902 avoids associated reboot issues, performance issues, and accessing the remotely located file 901 at the file system level. For example, the local version of the file 608 is accessed at the file system level in order to access the remotely located file 901. If the local version of the file 608 is accessed for data of the file 901 and this data does not reside locally, then the data is fetched at the volume level from the remotely located file 901.

For example, FIG. 6 shows the receiving and processing of a read operation upon the exposed version of the file 608 on top of the virtual volume 902, in accordance with various embodiments. The exposed file 608 is laid out on the virtual mounted file system 902 at volume offset f. The original backed-up file to be exposed 901 is located on Backup Volume 602. Backup Volume 602 can be any arbitrary storage device, for example, dedupe storage, FTP server, NAS device, CIFS share, or any other type of storage device. The I/O Manager 603, Kernel Mode Driver 604, User Mode Application 606 and Shared Memory (not shown) operate in a similar manner to previous example embodiments, as shown in FIGS. 3A and 3B.

A read operation for reading a backed-up file at volume offset v and length 1 (v, 1) is received at I/O manager 603. The read operation is sent to Kernel Mode driver 604 and User Mode Application 606, as previous discussed in other example embodiments. The User Mode Application 606 first attempts to read the backed-up file 608 from the virtual volume 902 of a volume container file 607 where the file is exposed. The offset for reading from the virtual volume 607 is (v, (f−v)).

The virtual volume 902 is a sparse volume in a sparse container file 607 named "container.vol". The sparse container file 607 is stored in a local file system 903. It is possible and often likely that the exposed file 608 does not contain all of the data of the backed-up file 901 because of limited local storage space. If the exposed file 608 does not contain all of the data of the backed-up file 901 and the data at the offset to be read is not stored on the virtual volume 902, then User Mode Application 606 can read the data of the file 901 from the backed up storage device 602, at offset (0,(1−(f−v))).

Figure 7:
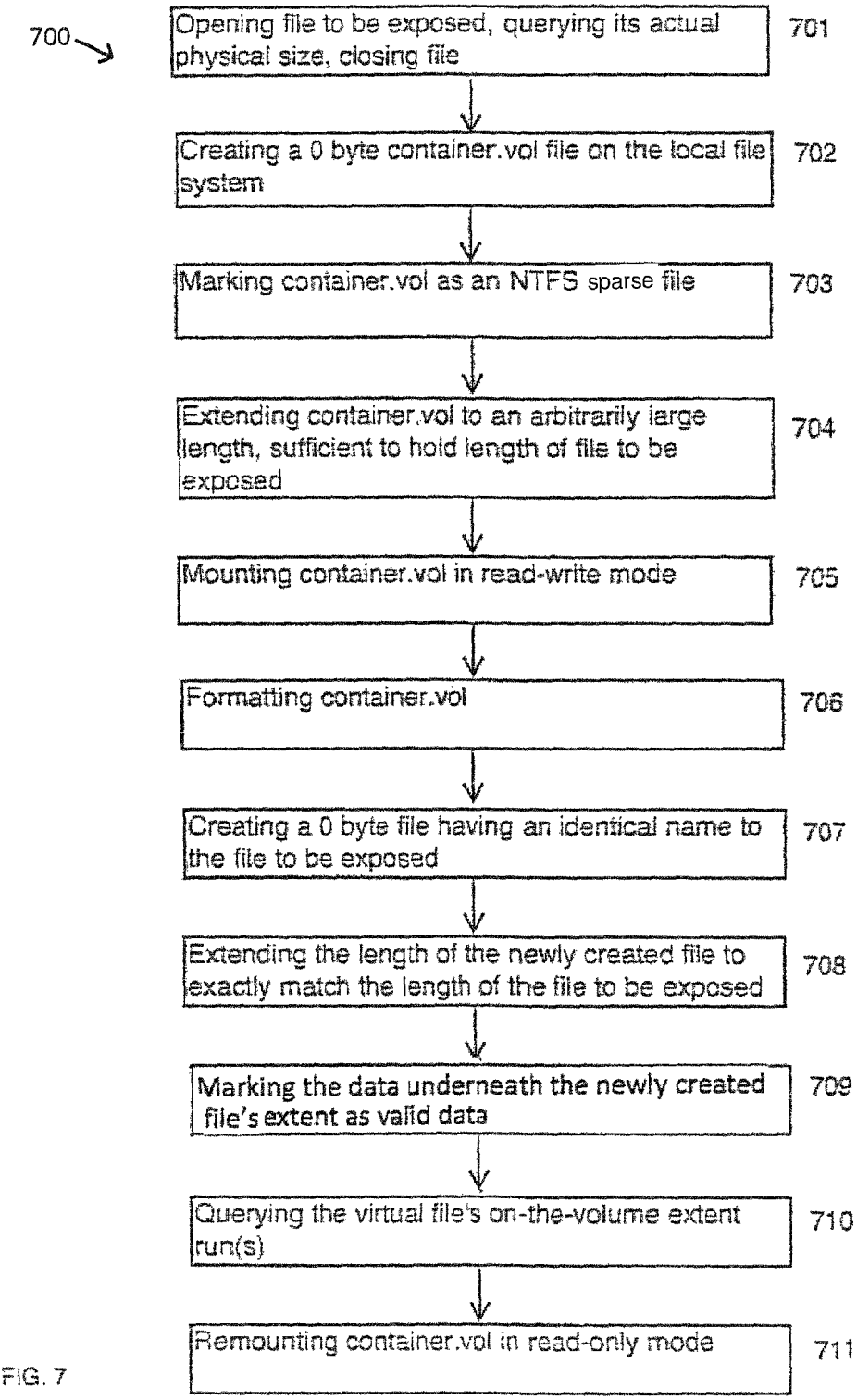
FIG. 7 illustrates an example of a process for exposing a file at the volume level, in accordance with various embodiments.

FIG. 7 illustrates an example 700 of a process for exposing a file on top of a virtual volume at the volume level, in accordance with various embodiments. Although this figure, as well as other process flows contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 701, the file to be exposed is opened. The file can be stored at any location on any type of storage, for example a dedupe storage, an FTP server, a storage array, a CIFS share, or any other type of storage device. The file size is then queried for its actual physical size. The file to be exposed is then closed.

Once the file is closed, a 0 byte file, in this example container.vol, is created locally on the system where the backed-up file is to be exposed, as shown in operation 702. This can be done through a variety of techniques, for example, the UNIX touch command. Once the 0 byte file is created, it is marked as an NTFS sparse file, as shown in operation 703. The file can be marked as an NTFS sparse file by using the FSCTL_SET_SPARSE control code, or any other available technique for marking a file as an NTFS sparse file. Once the file has been marked as an NTFS sparse file, the 0 byte file, container.vol, can be extended to an arbitrarily large length, as shown in 704. The arbitrarily large length can be sufficient to hold the length of the exposed file as queried in operation 701. The file can be extended in a variety of ways, for example, by positioning the file pointer at the queried extended length and setting the EOF (end of file) or any other available technique for extending a file length. Container.vol can now be physically present on the system's local drive having a logical size of the arbitrarily large length+exposed file's length, as queried in operation 701. The actual physical size of container.vol can be 4KB.

Once container.vol is extended to an arbitrarily large length, container.vol can be mounted in read-write mode, as shown in operation 705. Container.vol is mounted at the block level using the processes described in FIG. 1-5 above. Once container.vol is mounted in read-write mode, the operating system can engage its file system recognizer subsystem and can determine, via the registered file system drivers, ownership of the mounted file. Each file system driver can check and verify if its particular on-the-disk signature bytes exist inside the mount. Since there is no file system written inside the mount, container.vol, each file system driver will fail to claim ownership, which can result in the operating system marking the mount as a raw partition.

Once container.vol is mounted, the format process is launched to format container.vol, as shown in operation 706. The format can be launched by using a variety of different methods, for example "format/Q T:". The format will impose a file system layout on the raw mount container.vol, which can be a flat sparse NTFS volume image file. During the format process, a check can be made inside the mount driver to determine if any "zeroed blocks" are being written, in their entirety, to the underlying sparse container volume. If "zeroed blocks" are being written, the driver can skip all such writes marking them as successful, as corresponding reads on all such blocks would already provide zeroed data. This can happen as the NTFS file system instance hosting the sparse container.vol file would echo back zeroed blocks.

Once the format is completed and container.vol is an active read-write mount with an empty file system written against it, a 0 byte file with an identical name of the file to be exposed is created on container.vol, as shown in operation 707. This can be done as shown in operation 702. Once the 0 byte file has been created, for example test.txt, the length of the 0 byte file is extended to exactly match the length of the file to be exposed. Once the file length is extended, the data underneath the file's extent can be marked as valid data, as shown in operation 709. After the extend process, the underlying volume block data of text.txt is not "valid" and any reads on the virtual file would return zeroed out blocks. This is because of a security feature in the file system where all reads are intercepted by the NTFS file system instance, which is layered on top of the mount driver, suppressing the user's ability to query the underlying volume blocks. This security feature needs to be bypassed so the read I/O can reach the kernel mode driver, which controls the underlying block device using redirected I/O to the user mode application. There are two techniques to make the data as valid. The preferred technique is to use the SetFileValidData function, which can unconditionally and immediately mark the data underneath the file's extent as valid data. Another technique would be to write valid data from the actual backed-up file to be exposed into the virtual file from offset 0 till the end. However, this can cause issues if the local file system is not large enough to hold all of the exposed file's data locally.

Once the data underneath the newly created file's extent is marked as valid, the virtual file's on-the-volume extent run is queried, as shown in operation 710. This can be a single file system extent that maps the entire file's size inside a big volume window on the virtual volume. Upon the execution of the query, the virtual file's location is on the volume, which can be a flat linear volume window.

Once the virtual file's on-the-volume extent run is queried, container.vol is remounted as read-only, as shown in operation 711. Container.vol is mounted read-only to prevent write operations to the exposed file test.txt.

Figure 8:
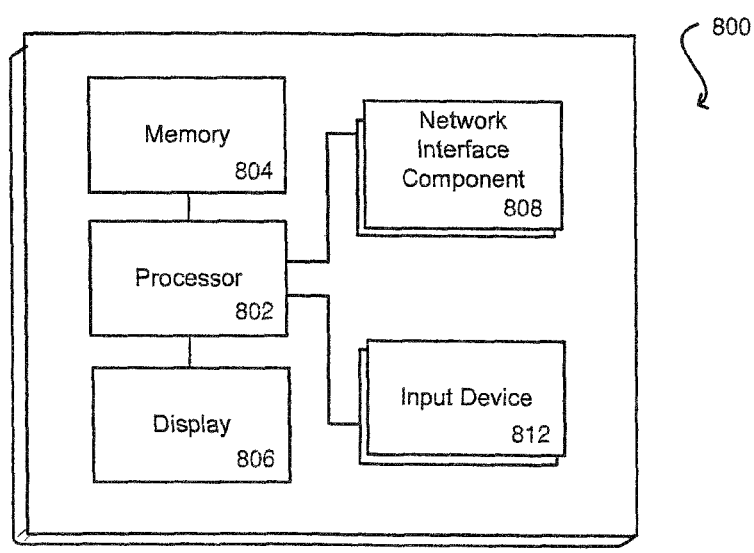
FIG. 8 illustrates a logical arrangement of a set of general components of an example computing device that can be utilized in accordance with various embodiments.

The various embodiments described throughout this disclosure can be utilized in a general purpose or specialized computing device. FIG. 8 illustrates a logical arrangement of a set of general components of an example computing device 800. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, keyboard, mouse, keypad, or any other such device or element whereby a user can input a command to the device. In some embodiments, the computing device 800 of FIG. 8 can include one or more network interface elements 808 for communicating over various networks, such as a Wi-Fi, Bluetooth, RF, wired, or wireless communication systems. The device in many embodiments can communicate with a network, such as the Internet, and may be able to communicate with other such devices.

Each computing device typically will include an operating system that provides executable program instructions for the general administration and operation of that device and typically will include computer-readable medium storing instructions that, when executed by a processor of the server, allow the computing device to perform its intended functions. Suitable implementations for the operating system and general functionality of the servers are known or commercially available and are readily implemented by persons having ordinary skill in the art, particularly in light of the disclosure herein.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, SFTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle , Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method carried out by at least one hardware processor executing instructions in a non-transitory computer readable storage medium to expose a file on top of a virtual volume, the method comprising:
   (a) opening a file to be exposed, querying physical size of the file to be exposed, and closing the file to be exposed;
   (b) creating a volume container file on a local file system, the volume container file containing the virtual volume, the volume container file being a sparse file, and the volume container file having a logical length of at least the physical size of the file to be exposed;
   (c) mounting the virtual volume in read-write mode;
   (d) formatting the virtual volume;
   (e) creating a file on the virtual volume, the file created on the virtual volume having an extent length matching the length of the file to be exposed;
   (f) marking data underneath the extent of the file created on the virtual volume as valid data in the virtual volume, the marking comprising execution of a preset function that unconditionally and immediately marks the data underneath the file's extent as valid data;
   (g) querying an extent run of the file created on the virtual volume, wherein the querying comprises mapping a size of the file created on the virtual volume inside a volume window on the virtual volume; and
   (h) remounting the virtual volume as read-only.

2. The computer implemented method of claim 1, wherein step (b) includes setting the volume container file as a NTFS sparse file by using the FSCTL_SET_SPARSE control code.

3. The computer implemented method of claim 1, wherein step (b) includes creating the volume container file with an initial length of zero, setting the volume container file to a sparse state, and extending the volume container file to the logical length of at least the physical size of the file to be exposed.

4. The computer implemented method of claim 1, wherein step (e) includes creating the file created on the virtual volume to have an initial volume to have an initial extent length of zero, and then extending the file created on the virtual volume to have the extent length matching the length of the file to be exposed.

5. The computer implemented method of claim 1, wherein the file created on the virtual volume has an identical name to the file to be exposed.

6. The computer implemented method of claim 1, wherein the data is marked valid in step (f) by using the SetFileValidData function.

7. A computing system, comprising:
   at least one hardware processor; and
   non-transitory computer readable storage medium including instructions that, when executed by the at least one hardware processor, cause the computing system to:
   (a) open a file to be exposed, query physical size of the file to be exposed;
   (b) create a sparse volume container file on a local file system, the sparse volume container file having a logical length of at least they physical size of the file to be exposed, and the sparse volume container file containing a virtual volume;
   (c) mount the virtual volume in read-write mode;
   (d) format the virtual volume;
   (e) create a file on the virtual volume, the file created on the virtual volume having an extent length matching the length of the file to be exposed;
   (f) mark data underneath the extent of the file created on the virtual volume as valid data in the virtual volume, which comprises execution of a preset function that unconditionally and immediately marks the data underneath the file's extent as valid data;
   (g) query an extent run of the file created on the virtual volume, which comprises mapping a size of the file created on the virtual volume inside a volume window on the virtual volume; and
   (h) remount the virtual volume as read-only.

8. The computing system as claimed in claim 7, wherein the instructions, when executed by the at least one processor, cause the computing system to set the volume container file as a NTFS sparse file by using the FSCTL_SET_SPARSE control code.

9. The computing system as claimed in claim 7, wherein the instructions, when executed by the at least one processor, cause the computing system to create the volume container file with an initial length of zero, set the volume container file to sparse state, and extend the volume container file to the logical length of at least the physical size of the file to be exposed.

10. The computing system as claimed in claim 7, wherein the instructions, when executed by the at least one processor, cause the computing system to create the file created on the virtual volume to have an initial extent length of zero, and then extend the file created on the virtual volume to have the extent length matching the length of the file to be exposed.

11. The computing system as claimed in claim 7, wherein the file created on the virtual volume has an identical name to the file to be exposed.

12. The computing system as claimed in claim 7, wherein the instructions, when executed by the at least one processor, cause the computing system to use the SetFileValidData function to mark the data underneath the extent of the file created on the virtual volume as valid data in the virtual volume.

13. A non-transitory computer readable storage medium storing one or more sequences of instructions that, when executed by one or more processors, cause the one or more processors to expose a file on top of a virtual volume by:
   (a) opening a file to be exposed, querying physical size of the file to be exposed, and closing the file to be exposed;
   (b) creating a volume container file on a local system, the volume container file containing the virtual volume, the volume container file being a sparse fiber, and the volume container file having a logical length of at least the physical size of the file to be exposed;
   (c) mounting the virtual volume in read-write model;
   (d) formatting the virtual volume;
   (e) creating a file on the virtual volume, the file created on the virtual volume having an extent length matching the length of the file to be exposed;
   (f) marking data underneath the extent of the file created on the virtual volume as valid data in the virtual volume, the marking comprising execution of a preset function that unconditionally and immediately marks the data underneath the file's extent as valid data;
   (g) querying an extent run of the file created on the virtual volume, wherein the querying comprises mapping a size of the file created on the virtual volume inside a volume window on the virtual volume; and
   (h) remounting the virtual volume as read-only.

14. The non-transitory computer readable storage medium as claimed in claim 13, wherein step (b) includes setting the volume container file as NTFS sparse file by using the FSCTL_SET_SPARSE control code.

15. The non-transitory computer readable storage medium as claimed in claim 13, wherein step (b) includes creating the volume container file with an initial length of zero, setting the volume container file to a sparse state, and extending the volume container file to the logical length of at least the physical size of the file to be exposed.

16. The non-transitory computer readable storage medium as claimed in claim 13, wherein the file created on the virtual volume has an identical name to the file to be exposed.

17. The non-transitory computer readable storage medium as claimed in claim 13, wherein the data is marked valid in step (f) by using the SetFileValidData function.

\* \* \* \* \*